Sept. 15, 1931.    W. TAIT    1,823,070
COMBINED SAFETY GUARD AND ANTISKID DEVICE
Filed Feb. 14, 1931    3 Sheets-Sheet 2
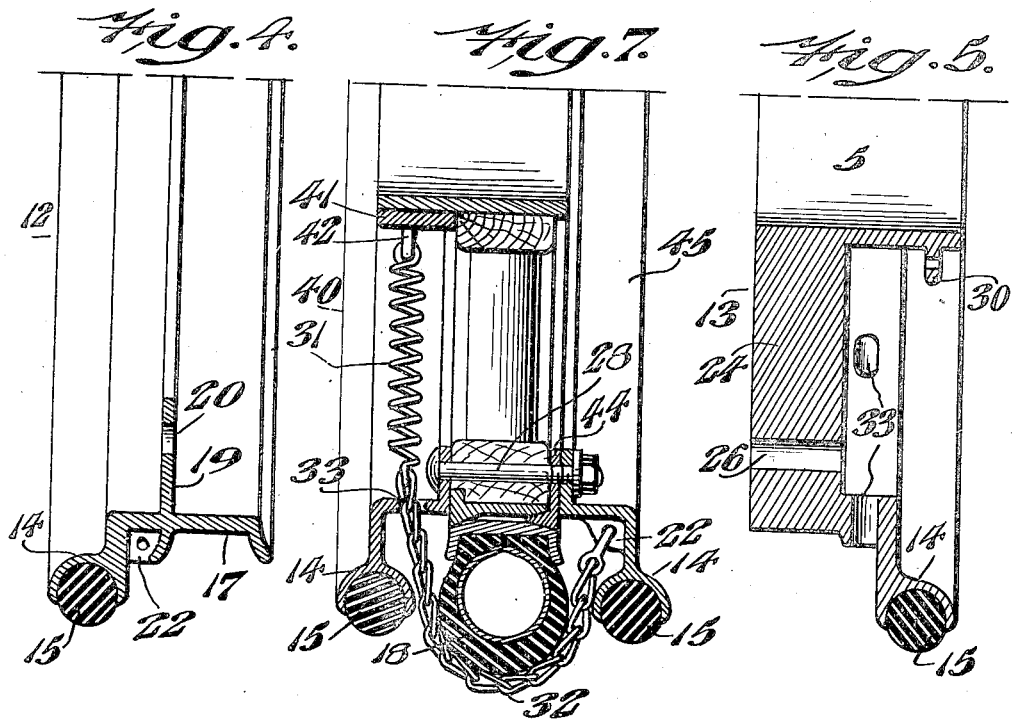
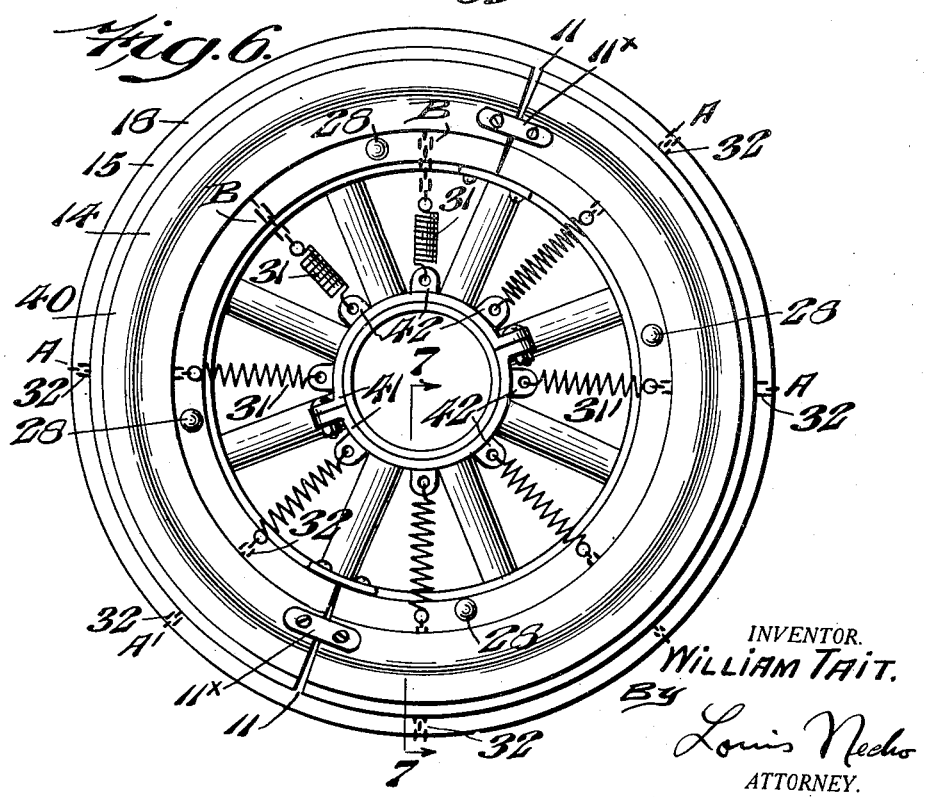
INVENTOR.
WILLIAM TAIT.
By Louis Necho
ATTORNEY.

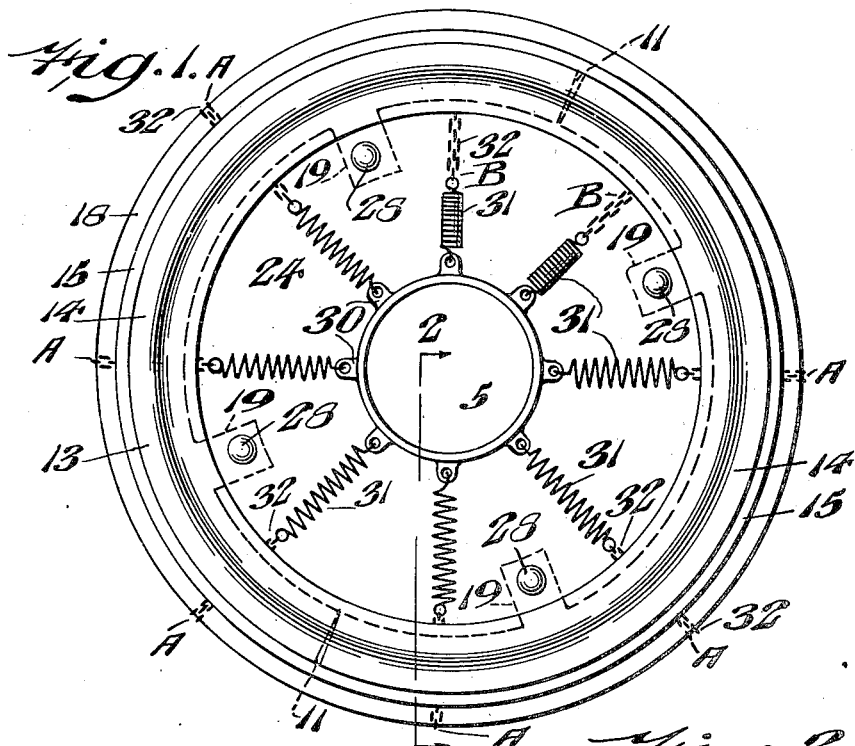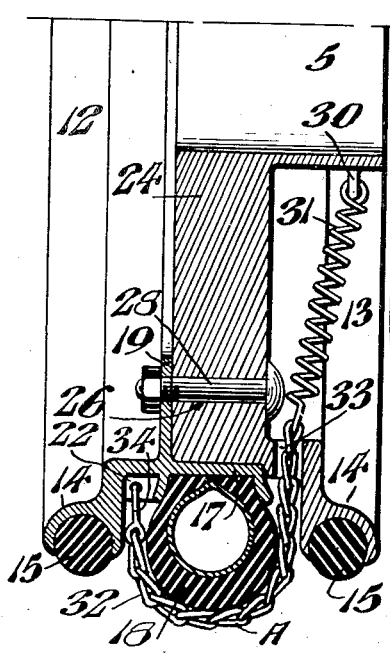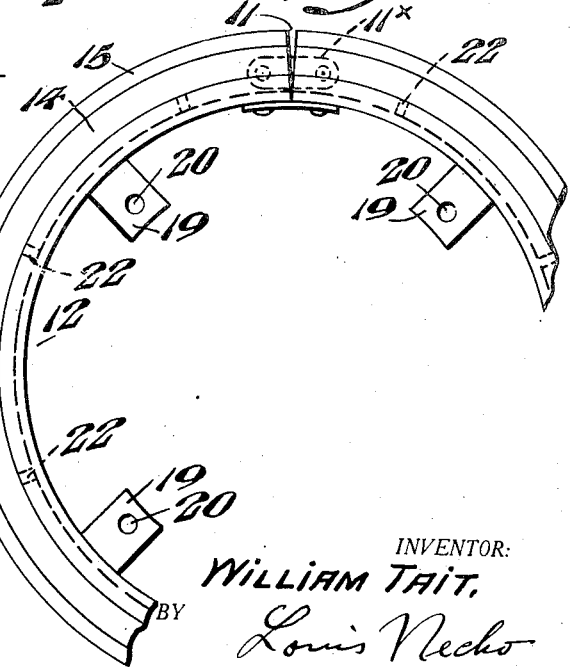

Sept. 15, 1931.  W. TAIT  1,823,070
COMBINED SAFETY GUARD AND ANTISKID DEVICE
Filed Feb. 14, 1931  3 Sheets-Sheet 3
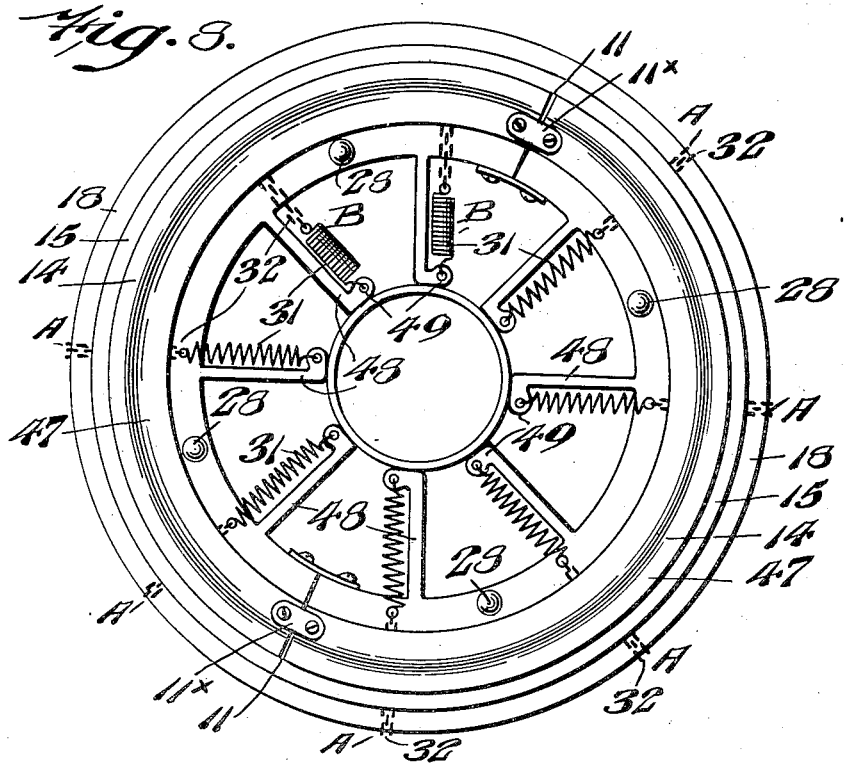
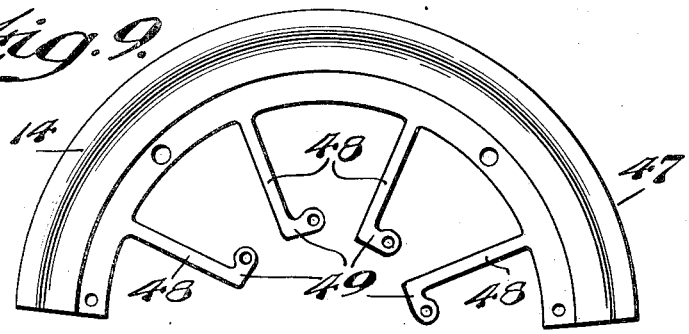
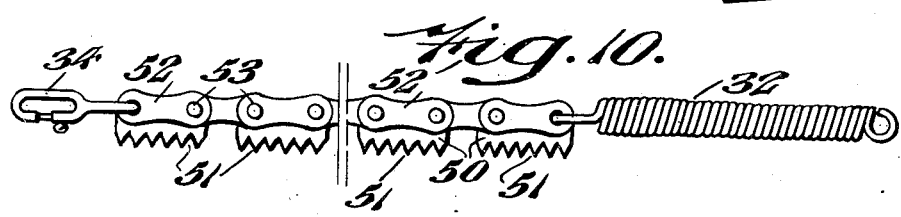
INVENTOR:
WILLIAM TAIT.
ATTORNEY Patented Sept. 15, 1931

1,823,070

UNITED STATES PATENT OFFICE

WILLIAM TAIT, OF READING, PENNSYLVANIA, ASSIGNOR OF ONE-HALF TO FRANCIS TAIT, OF WEST LAWN, PENNSYLVANIA

COMBINED SAFETY GUARD AND ANTISKID DEVICE

Application filed February 14, 1931. Serial No. 515,652.

My invention relates to a new and useful combined safety guard and anti-skid device which is particularly adapted for application to the wheels of self-propelled vehicles such as automobiles, trucks and the like, whereby the danger of overturning due to a blow-out when the motor car is traveling at a high speed and whereby the motor car is guarded against slipping and skidding.

My invention still further relates to a combined safety guard and anti-skid device which is carried by the wheels of the vehicle permanently, the safety guard being adapted to be automatic in its operation, that is, to be available for emergency at any time, and the anti-skid device being adapted to be applied for use in a minimum of time and labor.

My invention still further relates to a novel device of the general character stated, which may be incorporated or built-in in wheels when the same are being manufactured, or which may be applied to wheels of vehicles already in actual use.

My invention still further relates to a device of the general character stated which is extremely simple in construction, economical in cost and attractive in appearance so that the appearance of the vehicle to the wheels of which my novel device is applied is improved.

It has been the practice heretofore to employ anti-skid chains which are normally carried in the tonneau of the vehicle or under the rear seat to be applied to the wheels when the slippery character of the road necessitates the use of said chains. Chains of this character can not be applied without first raising the wheels off the road and locking said chains in position. This is a task of tremendous difficulty especially in cold weather or on muddy roads. Furthermore, it often happens that a stretch of road is slippery and the rest is dry, and vice versa, and due to the difficulty of applying and removing the chains, the motorist is apt to dispense with their use or to fail to remove them, increasing the hazard in one case and increasing the wear and tear in the other. The expedients heretofore adopted to remedy this condition have consisted generally in providing spikes that are adapted to engage the road when a blow out occurs and in providing chains carried by the wheels and adapted to be spread around the tread of the tire, the latter structure, however, while aiming at the same objective as the present invention, differ materially in the structure and assembly hereinafter shown and described.

To the above ends my invention consists of inner and outer rigidly carried rims of a slightly smaller diameter than the diameter inflated tire, said rims being provided with annular bands of solid rubber and being adapted to engage the road and support the vehicle when a blow out occurs or when a tire is deflated.

My invention further consists of a series of chains of a length sufficient to extend across the tread of an inflated tire, said chains being carried by the inner sides of the wheels in an inoperative position to be applied to the operative position at will, without the necessity of raising the wheels from the road.

My invention still further consists of springs which are adapted to hold said chains in taut manner to prevent rattling when not in use and to maintain said springs in position when in use.

My invention still further consists in various other novel features of construction and advantage all as hereinafter described and claimed in connection with the accompanying drawings, in which:

Fig. 1 is a view in elevation of a wheel provided with a combined safety guard and anti-skid device embodying my invention.

Fig. 2 is a section on line 2—2 of Fig. 1.

Fig. 3 is a fragmentary view in elevation showing details of construction.

Fig. 4 is a view of the safety guard shown on the left hand portion of Fig. 2 shown detached.

Fig. 5 represents a view similar to Fig. 4 showing the safety guard shown at the right hand portion of Fig. 2.

Fig. 6 is a view similar to Fig. 1 showing a modified form of the invention.

Fig. 7 is a fragmentary sectional view on line 7—7 of Fig. 6.

Fig. 8 is a view similar to Figs. 1 and 6 showing a still further modified form of the invention.

Fig. 9 is a fragmentary view of the auxiliary rim forming part of the construction shown in Fig. 8.

Fig. 10 is a view in side elevation of the chain which constitutes the anti-skid device of my invention.

Referring to the drawings, in which like reference characters indicate like parts, and with particular reference to Figs. 1 and 2, I have shown a novel wheel construction embodying my invention which comprises an outer rim 12 and an inner rim 13, each of said rims being split as at 11 and joined by the plate or link 11X and being provided at their peripheries with the annular seats or grooves 14 which receive and engage the rubber bands 15. The outer rim 12 is provided with the integral seat 17 which receives the inflated tires 18 and with the flange 19 which is provided with the aperture 20. 22 indicates an apertured lug provided adjacent the outer end of seat 17, and will herein after be further referred to. The inner rim 13 is provided with integral body portion 24 which has the aperture 26 and which aligns with the aperture 20 in the flange 19 of the outer rim 12, for receiving the bolt or other fastening means 28 for holding the inner and outer rims together to form a wheel. Anchored to a suitable point 30 in the body of the inner rim 13 is a spring 31 which is connected at the front or free end thereof with the inner end of the anti-skid chain 32, said anti-skid chain being adapted to pass through an opening 39 in the body of the inner rim 13, and being provided with a hook 34 adapted to engage the apertured lug 22 in a manner hereinafter set forth.

In Figs. 6 and 7 I have shown my invention as applied to a conventional wooden wheel of an automobile, wherein I use an inner split rim 40 provided with the annular seat 14 holding the annular band 15, and having the opening 33 for the passage of the chain 32. 41 designates a split band clamped around the inner hub of the wheel and having the apertured lug 42 to which may be anchored the inner ends of the springs 31 which carry at their other ends the anti-skid chains 32 in the manner heretofore described. The rim 40 is suitably secured to the inner side of an automobile wheel by the bolts 28 which pass thru the rim of the wheel and which normally serve to hold the conventional retaining split ring 44 in position. 45 designates an outer split rim which carries a seat 14 holding a band or tire 15 and the apertured lugs 22 for engaging the hooks 34 at the free ends of the chains 32. The remainder of the structure illustrated in Fig. 7 is conventional and need not be further described.

In Figs. 8 and 9 I have shown a further modification of the invention wherein I employ inner and split rims having the seats 14 and bands 15 and being secured together by the bolts 43, the outer rim (not shown) being preferably identical with the structures shown in Fig. 4 and in the right hand portion of Fig. 7, and the inner rim being provided with the inwardly projecting arms 48 which carry the hooks 49 for engaging the inner ends of the springs 31, the hooks 49 on the inner ends of the arms 48 being in lieu of the anchoring hook 30 illustrated in Fig. 5.

In Fig. 9 I have shown a modified form of chain which consists of the blocks 50 having the bottom or outer surface thereof serrated as at 51, said blocks being flexibly connected by the links 52 which are engaged by the pivot pins 53.

The operation is as follows: When the tire 18 blows out or is deflated, the bands 15 engage the road thereby supporting the car and preventing damage of the inner tube in the tire 18.

If, however, a blow out occurs at high speed, the vehicle is, if not provided with the bands 15, in grave danger of overturning due to the sudden stopping which results from the engagement of the iron rim of the wheels with the road. With the rubber bands 15 engaging the road in the case of a blow out, the car will continue to run and will slowly come to stop.

The anti-skid chains, whether of the structure shown in Figs. 2 and 7 or of the structure shown in Fig. 10 are of a length sufficient to circumscribe or go around an inflated tire 18, and are of a thickness or diameter which permits their free passage through the openings 33, the hooks 34 at the ends of said chains being larger than and not passable through the openings 33. Thus, when it is desired to apply the anti-skid chains, it is merely necessary to pull the hooks 34 out by means of a screw driver or other elongated tool, and against the tension of the springs 31, said hooks being then engaged by the apertured lugs 22, located at a point opposite to the openings 33. In this position of the parts the springs 31 are distended or stretched and the chains 32 are extended entirely across the tire 18, as at A in Figs. 1, 6 and 8. (See also Figs. 2 and 7.) When it is not desired to use the anti-skid chains 32 it is merely necessary to disengage the hooks 34 from the lugs 22, whereupon the springs 31 resume their contracted position as at B in Figs. 1, 6 and 8 and in this position of the parts the hooks 34 which are larger than the openings 33 abut against said openings and prevent the complete withdrawal of the chains 32, which now extend in a taut manner between the outer ends of the springs 31 and the hooks 34 engaged by the openings 33.

By being thus drawn taut, the chains 32 are prevented from rattling or in any way interfering with the rest of the structure.

While the form of my invention illustrated in Fig. 2 is particularly adapted to the structure of new wheels of the type known as disc wheels, and that shown in Fig. 7 is adapted for use on the conventional wooden wheels, I have shown in Figs. 8 and 9 a form of the invention which enables me to equip any wheels now in use, regardless of their size, structure or nature with both the antiskid guards and the chains, without in any way interfering with the structure and at very little cost. The inner and outer rims employed in the various forms of the invention illustrated in the drawings are split to faciliate the application and removal of the tire 18 or annular bands 15 as the case may be.

Claims:

1. A combined safety guard and anti-skid device for the wheels of vehicles comprising inner and outer demountable split rims, each of said rims having an annular seat, annular cushioning bands positioned in said seats, cushioning bands positioned in said seats, the over-all diameter of said cushioning bands being slightly less than the over-all diameter of an inflated tire positioned on said wheel, tension devices carried by said inner rim, anti-skid chains having their inner ends secured to the ends of said tension devices, said chains and tension devices being adapted to pass freely through openings in said inner rim, hooks on the free ends of said chains, said hooks being too large to pass through said openings, means on said outer rim adapted to engage said hooks and means for detachably securing said inner and outer rims in contiguous aligned position.

2. A combined safety guard and anti-skid device for the wheels of vehicles comprising inner and outer demounted split rims, each of said rims having an annular seat, annular cushioning bands positioned in said seats, the over-all diameter of said cushioning bands being slightly less than the over-all diameter of an inflated tire positioned on said wheel, annular members adapted to be clamped about the hubs of said wheels, apertured lugs on the peripheries of said annular members, tension devices anchored in said apertured lugs, anti-skid chains having their inner ends secured to the free ends of said tension devices, said chains and tension devices being adapted to pass freely through an opening in said inner rim, hooks on the free end of said chains, said hooks being too large to pass through said openings, means on said outer rim adapted to engage said hooks, means for detachably securing said inner and outer rims in contiguous aligned position.

3. A combined safety and anti-skid device for the wheels of vehicles comprising inner and outer demountable split rims, each of said rims having an annular seat, annular cushioning bands positioned in said seats, the over-all diameter of said cushioning bands being slightly less than the over-all diameter of an inflated tire positioned on said wheel, anchoring devices carried by said inner rim, tension devices having their inner ends secured to said anchoring devices, anti-skid chains having their inner ends secured to the free ends of said tension devices, said chains and tension devices being adapted to pass freely through openings in said inner rim, hooks on the free ends of said chains, said hooks being too large to pass thru said openings, means on said outer rim adapted to engage said hooks and means for detachably securing said inner and outer rims in contiguous aligned position.

WILLIAM TAIT.